United States Patent
Ali et al.

(10) Patent No.: US 11,811,520 B2
(45) Date of Patent: Nov. 7, 2023

(54) MAKING SECURITY RECOMMENDATIONS

(71) Applicant: International Business Machines Corporation, Armonk, NY (US)

(72) Inventors: Mariya Ali, Herndon, VA (US); Steven Dale McKay, Kechi, KS (US); Michael J Spisak, East Northport, NY (US); Jelle Denis, Overijse (BE)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 17/117,295

(22) Filed: Dec. 10, 2020

(65) Prior Publication Data
US 2022/0191229 A1    Jun. 16, 2022

(51) Int. Cl.
*H04L 9/40* (2022.01)
*G06F 21/55* (2013.01)
*G06F 21/56* (2013.01)
*G06N 20/00* (2019.01)

(52) U.S. Cl.
CPC ......... *H04L 63/1433* (2013.01); *G06N 20/00* (2019.01); *H04L 63/1425* (2013.01)

(58) Field of Classification Search
CPC ............ H04L 63/1433; H04L 63/1425; H04L 63/1416; H04L 63/1441; H04L 63/20; H04L 9/40; G06N 20/00; G06F 21/552; G06F 21/554; G06F 21/56
See application file for complete search history.

(56) References Cited

U.S. PATENT DOCUMENTS

| | | | |
|---|---|---|---|
| 8,515,895 B2 | 8/2013 | Benson et al. | |
| 10,148,679 B2 | 12/2018 | Mulchandani et al. | |
| 10,193,920 B2 | 1/2019 | Satish et al. | |
| 10,681,061 B2 | 6/2020 | Jang et al. | |
| 10,735,451 B1* | 8/2020 | Baker ..................... | H04L 63/20 |

(Continued)

FOREIGN PATENT DOCUMENTS

| | | |
|---|---|---|
| CN | 108537568 A | 9/2018 |
| CN | 109241399 A | 1/2019 |

(Continued)

OTHER PUBLICATIONS

UK Examination Report GB2117001.4 dated Mar. 31, 2023.

(Continued)

*Primary Examiner* — Joseph P Hirl
*Assistant Examiner* — Aayush Aryal
(74) *Attorney, Agent, or Firm* — Donald J. O'Brien

(57) ABSTRACT

Embodiments are disclosed for a method. The method includes determining multiple recommended actions based on a security incident using an action model trained to make recommendations. The method also includes determining multiple similar targets to a target of the security incident using a collaborative filtering model trained to assign a confidence value of similarity between two targets. The method further includes assigning a plurality of weights to the recommended actions based on one or more actions taken by the similar targets and the confidence value, and a success or failure of the recommended actions. Additionally, the method includes generating a prioritized list of the recommended actions that is sorted based on the assigned weights.

25 Claims, 7 Drawing Sheets

(56) References Cited

U.S. PATENT DOCUMENTS

| | | | |
|---|---|---|---|
| 2014/0201180 A1 | 7/2014 | Fatourechi et al. | |
| 2018/0103052 A1 | 4/2018 | Choudhury et al. | |
| 2019/0124108 A1* | 4/2019 | Doyle | G06F 21/45 |
| 2019/0190945 A1 | 6/2019 | Jang | |
| 2020/0092319 A1 | 3/2020 | Spisak | |
| 2020/0259861 A1* | 8/2020 | Margel | H04L 63/20 |
| 2021/0279603 A1* | 9/2021 | Teran Matus | G06V 20/40 |
| 2021/0397625 A1* | 12/2021 | Wan | G06N 20/00 |

FOREIGN PATENT DOCUMENTS

| | | |
|---|---|---|
| CN | 110362738 A | 10/2019 |
| CN | 111192108 A | 5/2020 |
| CN | 111899061 A | 11/2020 |
| WO | 2015160367 A1 | 10/2015 |
| WO | 2020124026 A1 | 6/2020 |

OTHER PUBLICATIONS

CN202111391872.1 Application—Notice of Second Office Action dated Jan. 28, 2023 [English Translation]. 10 pgs.

Lyons, K.B. (2014). "A Recommender System in the Cyber Defense Domain" (2014). Theses and Dissertations. 612. https://scholar.afit.edu/etd/612.

CN 202111391872.1 Notification of the Fourth Examination Opinion dated Jul. 6, 2023 8 pgs.

Cichonski et al., "Computer Security Incident Handling Guide", National Institute of Standards and Technology, U.S. Department of Commerce, Special Publication 800-61, Revision 2, Aug. 2012, 79 pages.

Unknown, "Privacy and Information Security Incident Response Plan (IRP)", University of California, Agriculture and Natural Resources, Mar. 2020, 34 pages.

Anonymous, "Run-Time Dynamic Compliance System for Software Development Life Cycle", An IP.com Prior Art Database Technical Disclosure, IP.com No. IPCOM000262569D, IP.com Electronic Publication Date: Jun. 12, 2020, 5 pages.

Anonymous, "Aggregation of Plural Security Standards for Dynamic Remediation", An IP.com Prior Art Database Technical Disclosure, IP.com No. IPCOM000257888D, IP.com Electronic Publication Date: Mar. 20, 2019, 3 pages.

Anonymous, "Method and Apparatus for Security Information & Event Management System Health Visualization", An IP.com Prior Art Database Technical Disclosure, IP.com No. IPCOM000255398D, IP.com Electronic Publication Date: Sep. 24, 2018, 5 pages.

Mell et al., "The NIST Definition of Cloud Computing", Recommendations of the National Institute of Standards and Technology, Sep. 2011, 7 pages.

"Patents Act 1977: Combined Search and Examination Report under Sections 17 and 18(3)", Intellectual Property Office, Patents Directorate, Your Reference: DP/P49965GB, Application No. GB2117001.4, dated May 23, 2022, 10 pgs.

* cited by examiner

MAKING SECURITY RECOMMENDATIONS

BACKGROUND

The present disclosure relates to security, and more specifically, to making security recommendations.

Security analysts can monitor their clients' computer communication networks in order to identify potential security incidents, e.g., a hacking attempt into a specific client's networks by a malicious user. Additionally, security analysts can identify patterns of attempts occurring across computer communication networks generally, which may indicate vulnerabilities of clients that may be potential targets of attack. Accordingly, these analysts can make recommendations to their clients for actions to take to mitigate any damage caused by, or prevent any action potentially taken by, malicious users.

SUMMARY

Embodiments are disclosed for a method. The method includes determining multiple recommended actions based on a security incident using an action model trained to make recommendations. The method also includes determining multiple similar targets to a target of the security incident using a collaborative filtering model trained to assign a confidence value of similarity between two targets. The method further includes assigning a plurality of weights to the recommended actions based on one or more actions taken by the similar targets and the confidence value, and a success or failure of the recommended actions. Additionally, the method includes generating a prioritized list of the recommended actions that is sorted based on the assigned weights.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
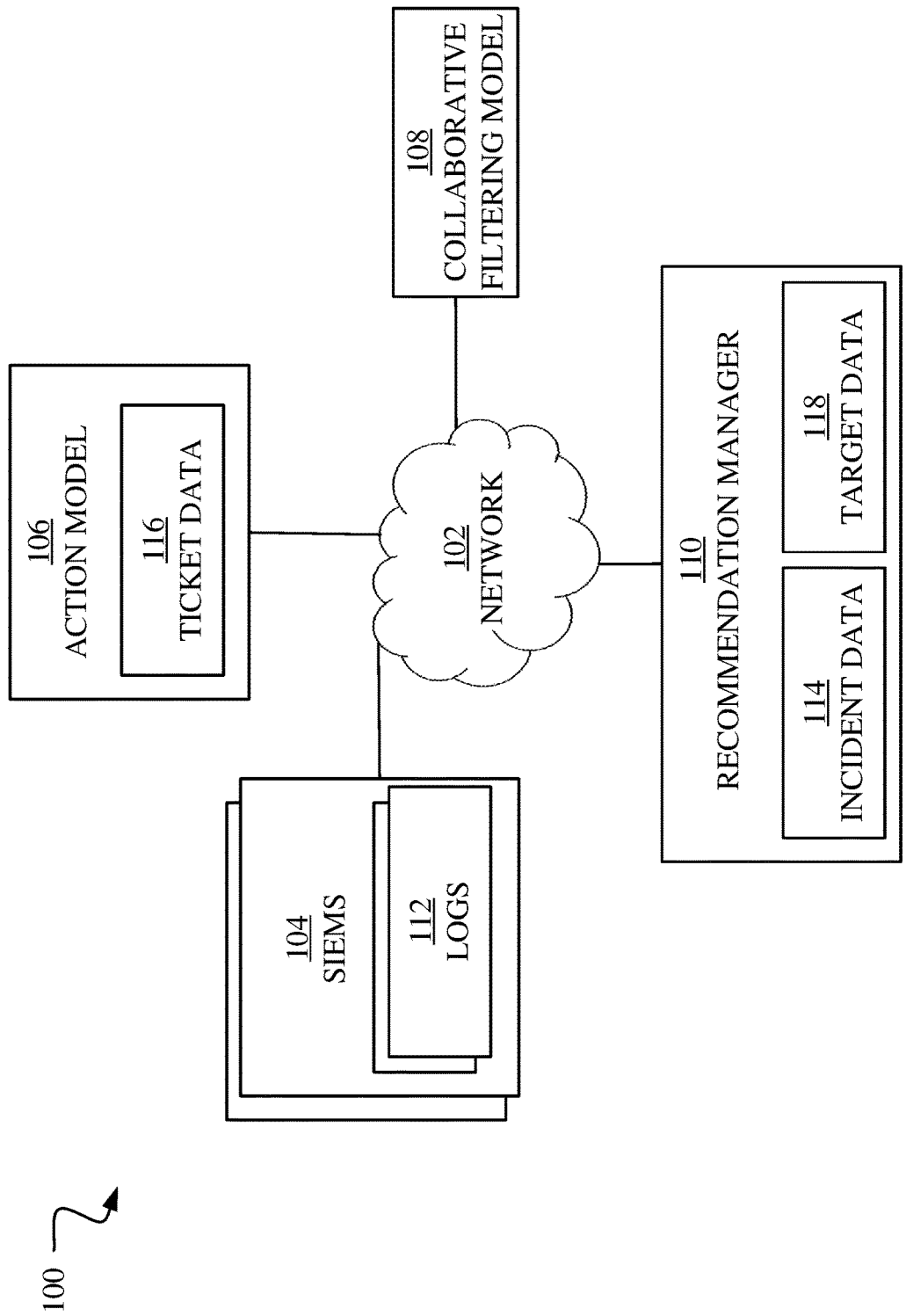
FIG. 1 is a block diagram of an example system for making security recommendations, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

As stated previously, security analysts can make recommendations to their clients for actions to take to mitigate any damage caused by, or prevent any action potentially taken by, malicious users in a security incident. Accordingly, while monitoring customer environments, security analysts can spend relatively large amounts of time creating client communications and notifying clients of recommended actions.

It is useful for the potential targets of security incidents to respond to these recommendations by taking action to prevent and/or mitigate damage by an actual or potential security incident. However, client communications can resemble cookie-cutter-like responses that clients may feel are not specifically relevant, thus causing clients to potentially ignore, and potentially fail to successfully remediate actual and/or potential damage from a security incident. Further, any resulting damage may increase the clients' cost for security and decrease the clients' satisfaction.

Accordingly, embodiments of the present disclosure can provide recommendations that are more relevant and meaningful to actual and/or potential targets of security incidents. Such embodiments can provide a list of recommended actions prioritized according to how successful the action has been historically for similar targets and security incidents. In this way, such embodiments can provide context to the recommendations that reflect similarities to successful historical responses to similar security incidents suffered by similar targets.

FIG. 1 is a block diagram of an example system 100 for making recommendations, in accordance with some embodiments of the present disclosure. The system 100 includes a network 102, security information and event management systems (SIEMS) 104, action model 106, collaborative filtering model 108, and recommendation manager 110. The network 102 may be a local area network, wide area network, or collection of computer communication networks that facilitates communication between components of the system 100, specifically, between the SIEMS 104, action model 106, collaborative filtering model 108, and recommendation manager 110. In some embodiments, the network 102 can be the Internet.

The term, SIEM, can refer to software tools and/or services that combine the management of security information and security events, i.e., security incidents. In this way, the SIEMS 104 can analyze logs 112 that are generated by a computer system and/or computer network to identify potential security incidents in real-time.

Typically, a security analyst can identify threats to networked computer systems by analyzing the transactions, i.e., events, that come into these systems. These events are recorded in the logs 112. However, because of the volume of logs 112, it can be challenging for security analysts to process the log data in the raw format in time to mitigate any potential damage. Thus, the STEMS 104 can process these logs 112 in a process called event normalization and categorization, whereby the SIEM generates offenses that a human security analyst can review. Offenses are events that the SIEM identifies as potential security incidents.

The action model 106 can be a machine learning model that is trained to recommend a list of actions for the target or potential target to take to prevent and/or mitigate damage from a security incident. In some embodiments of the present disclosure, the action model 106 includes ticket data 116. The ticket data 116 can be an index of security incidents to recommended actions and additional context that the action model 106 builds in its training.

The collaborative filtering model 108 can be a machine learning model that is trained to weight the similarity between targets of a security incident. The similarities can be determined based upon organizational factors of the targets, such as the size and potentially shared technical infrastructure components, for example. The similarities can be represented in a numeric representation between 0 and 1, where 0 represents no similarities and 1 represents full similarities.

The recommendation manager 110 can be a system that provides security recommendations having meaningful, actionable steps (both mitigation and prevention) that are relevant to their environment, and that have worked for similar targets in the past to remediate similar threats. The security recommendation can be automatically sent to clients or sent to analysts for confirmation depending on the confidence level provided by the recommendation manager 110. In this way, the recommendation manager 110 can reduce the costs and time spent by security analysts in researching and building recommended actions to benefit clients that are targets or potential targets of security incidents.

The recommendation manager 110 can include incident data 114 and target data 118. The incident data 114 can be collected from the logs 112 when the STEMS 104 report security incidents. Incident data 114 can include details, such as when the security incident took place, who is the organization being targeted, what SIEM rules are triggered by the security incident, what computer and/or network assets are involved and affected by the security incident, and the like. In some embodiments of the present disclosure, the recommendation manager 110 can train the action model 106 using the incident data 114. Further, the recommendation manager 110 can loop back training to the action model 106.

The target data 118 can represent information about organizations that are targets of historical security incidents. The target data 118 can describe the targets organizationally and technically. For example, target data 118 can include characteristics, e.g., the size, industry, infrastructure, infrastructure components, servers, and the like. These characteristics may be relevant to security incident responses because how organizations implement security controls can differ based on these characteristics.

In this way, the recommendation manager 110 can leverage a machine learning regression model to predict the applicability of a group of cyber security actions to remediate a specific security incident. Additionally, the recommendation manager 110 can leverage a collaborative filtering model 108 that incorporates a weighted alternate least squares (WALS) algorithm to identify clients of similar attributes. These attributes can include, for example, size, industry, and infrastructure components. Additionally, the recommendation manager 110 can weigh in factors of remediation actions of similar cyber incidents that were beneficial to other similar clients. Additionally, the recommendation manager 10 can leverage time analysis insights based on whether the action taken on the specified cyber incident was validated in that point in time. Further, some actions can take longer to implement than others. As such, the recommendation manager 110 can prioritize a short term action to take if the attack is critical and urgent based on the point in time when the security incident takes place. Further, the recommendation manager 110 can factor into a confidence score of the resulting actions to be taken in order of priority.

In this way, the recommendation manager 110 can help save the time and expense of security experts trying to customize a recommended list of actions to take in response to a security incident. Further, the recommendation manager 110 can prevent clients from getting cookie-cutter type responses because the recommendations from the recommendation manager 110 can use a response that is more tailored to the individual customer, thus increasing customer satisfaction and retention. As such, the recommendation manager 110 can provide tailored and customer relevant actions to clients. Additionally, the recommendation manager 110 can provide correlations with industry wide insights that human analysis may fail to identify.

Figure 2:
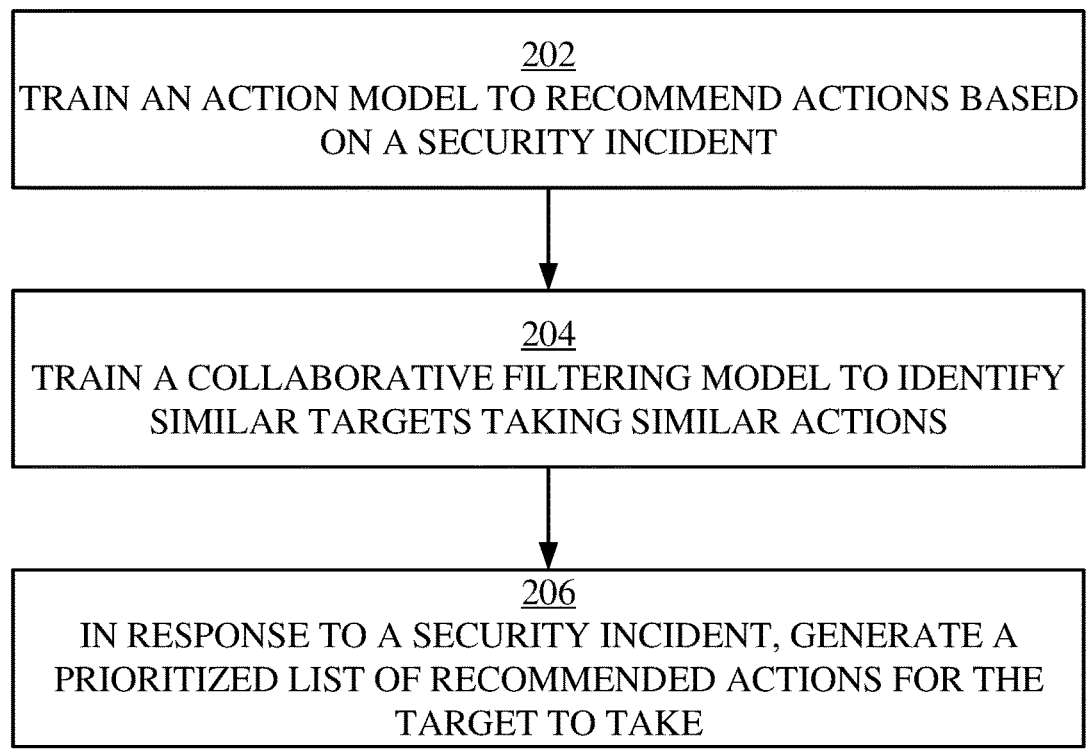
FIG. 2 is a process flow diagram of an example method for making security recommendations, in accordance with some embodiments of the present disclosure.

FIG. 2 is a process flow diagram of an example method 200 for making security recommendations, in accordance with some embodiments of the present disclosure. A recommendation manager, such as the recommendation manager 110, may perform the method 200.

At operation 202, the recommendation manager 110 can train the action model 106 to determine a list of recommended actions based on a security incident. Training the action model 106 can involve generating the ticket data 116 by collecting investigative data regarding historical security incidents, the actions that targets have taken, and the outcomes of the actions taken. Such information can be collected in the ticket data 116. Accordingly, the trained action model 106 can determine a set of recommended actions to take based on the investigative details of future security incidents.

At operation 204, the recommendation manager 110 can train the collaborative filtering model 108 to identify similar targets taking similar actions. Training the collaborative filtering model 108 can involve using collaborative filtering to group similar targets based on various target characteristics, e.g., the size, industry, infrastructure, infrastructure components, servers, and the like, since the companies may implement security controls differently based on these characteristics. Thus, the collaborative filtering model 108 can grade the similarity of a target to targets in the training data based on documented characteristics.

At operation 206, the recommendation manager 110 can, in response to a security incident, generate a prioritized list of recommended actions for the target to take. In some embodiments of the present disclosure, the recommendation manager 110 can use the collaborative filtering model 108 to weight the similarity of other targets taking the actions recommended by the action model 106. In some embodiments of the present disclosure, the action model 106 can additionally weight the recommended actions based on whether the action was successful.

Figure 3:
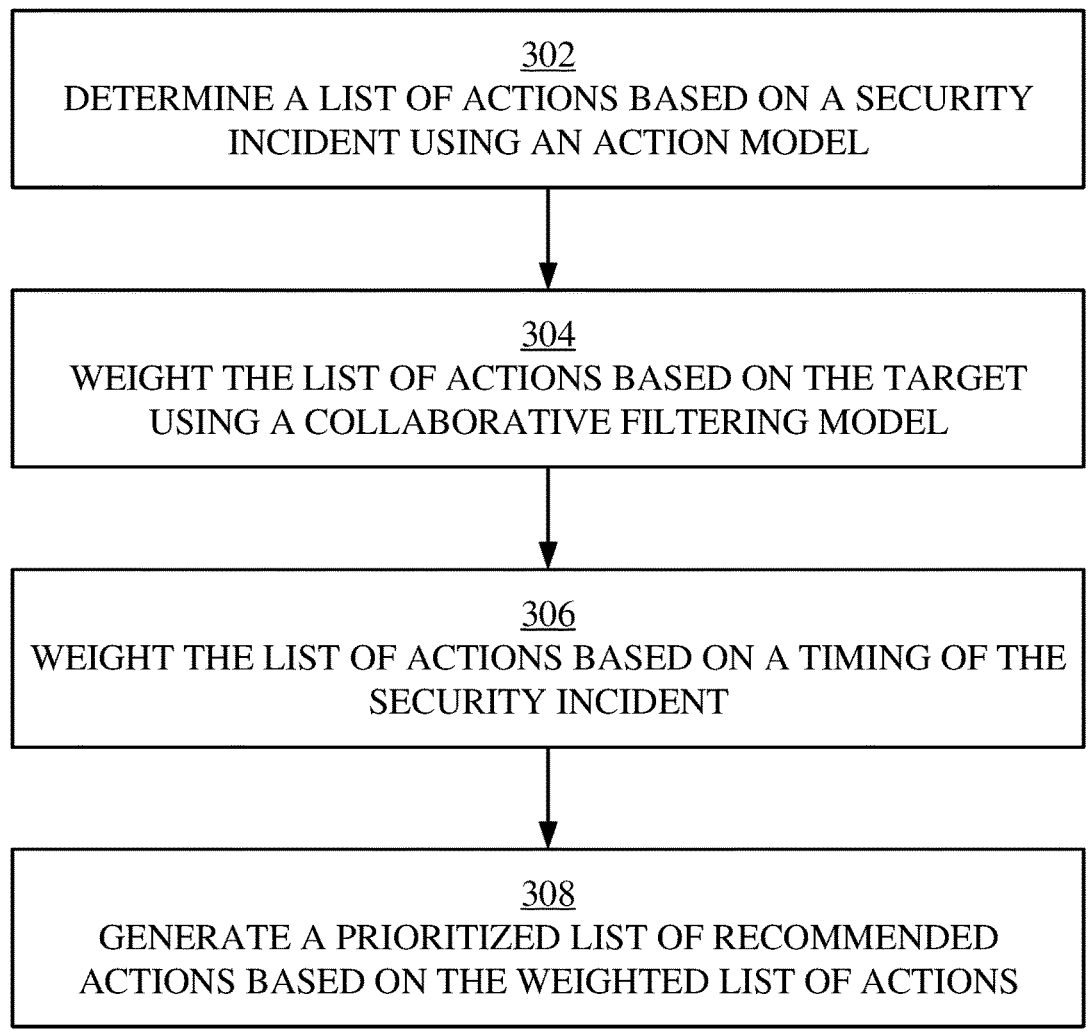
FIG. 3 is a process flow diagram of an example method for making security recommendations, in accordance with some embodiments of the present disclosure.

FIG. 3 is a process flow diagram of an example method 300 for making security recommendations, in accordance with some embodiments of the present disclosure. A recommendation manager, such as the recommendation manager 110, may perform the method 300.

At operation 302, the recommendation manager 110 can determine a list of actions based on a security incident and using an action model, such as the action model 106, described with respect to FIG. 1. The list of actions can include actions taken and outcomes, for example. In some embodiments of the present disclosure, the recommendation manager 110 can input investigation data of a security incident through the trained regression model, e.g., action model 106, before the security analyst even begins work. In this way, the security analyst can augment the work of the recommendation manager 110.

At operation 304, the recommendation manager 110 can weight the list of actions based on the target using the collaborative filtering model 108. According to some embodiments of the present disclosure, the recommendation manager 110 can run the target data 118 through the collaborative filtering model 108 to determine a confidence value on similarity of other targets in historical security incidents. Additionally, the recommendation manager 110 can correlate the determined list of actions from the action model 106 with actions taken by a similar target. Thus, if an action from the determined list was performed by a similar target, the recommendation manager 110 can apply a weighted value against the action that indicates the similarity of the historical target to the target. Further, if the recommendation manager 110 determines a specific action is a validated and/or successful fix, the recommendation manager can weight the action with a higher value than if the action is unsuccessful.

At operation 306, the recommendation manager 110 can further weight the list of actions based on a timing of the security incident. In some scenarios, the time of year can indicate whether there is an increased incidence of security incidents around holidays, anniversaries, and the like. Accordingly, in some embodiments of the present disclosure, the recommendation manager 110 can further weight the list of actions based on the timing the action was taken historically that has triggered the method 300. Thus, if a historical security incident for which an action was taken occurred at a different time of year than the current security incident, the recommendation manager 110 can decrease the weighting. Similarly, the recommendation manager 110 can increase the weighting if the time of year falls within a predetermined threshold of time.

At operation 308, the recommendation manager 110 can generate a prioritized list of recommended actions based on the weighted list of actions. The prioritized list can include a weighted result and recommendation based on possible outcomes. In other words, the prioritized list can be a weighted list of actions and outcomes, where the priority of an action correlates to its cumulative weight. The cumulative weight can be based on historical success, similarity to the historical target, the timing, and the like. Thus, the first priority is the action with the comparatively highest cumulative weight, down through to the last priority, which is the action with the comparatively lowest weight. In some embodiments of the present disclosure, the prioritized list can indicate the success rate of actions taken by similar clients.

Figure 4:
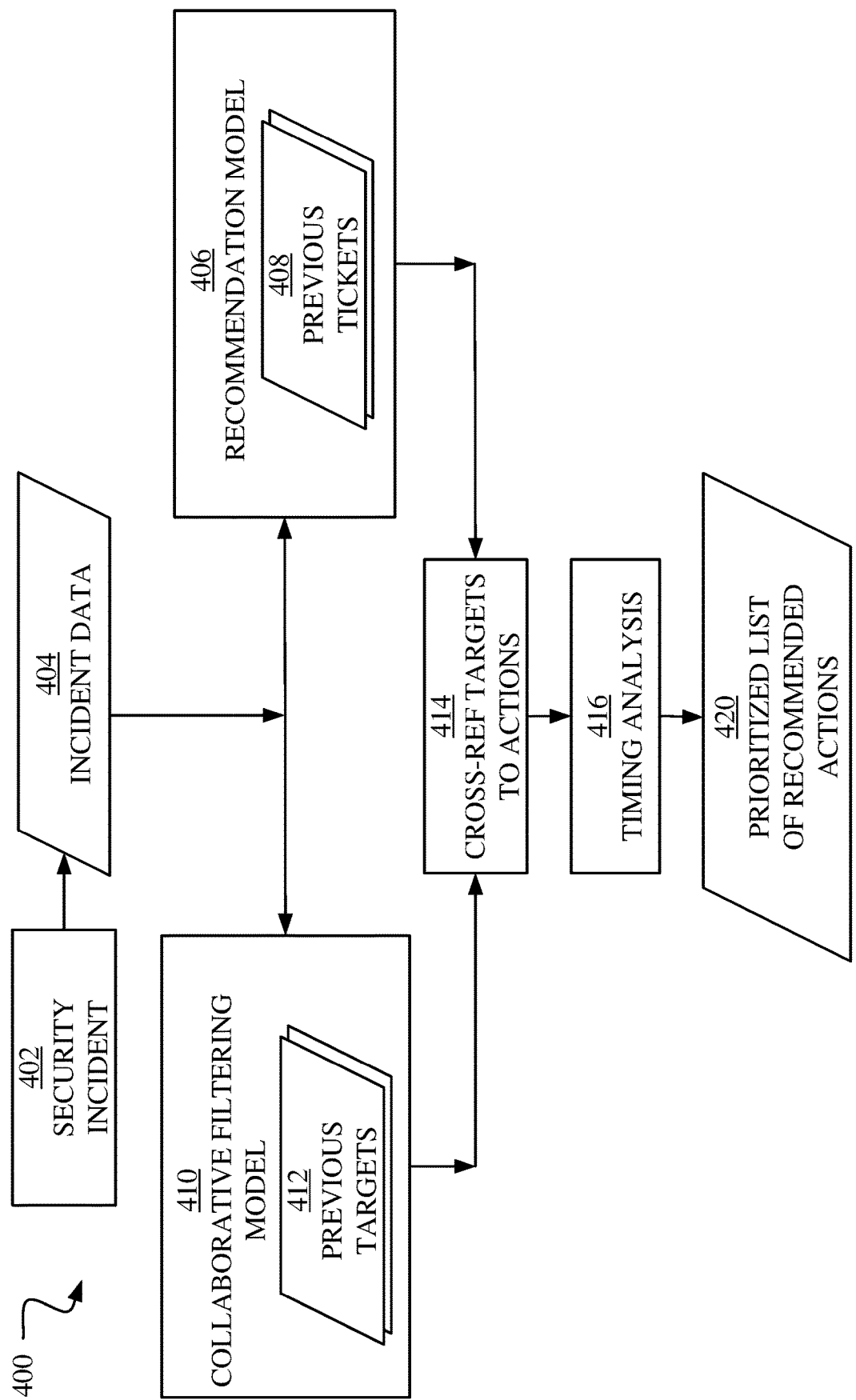
FIG. 4 is a data flow diagram of a process for making recommendations, in accordance with some embodiments of the present disclosure.

FIG. 4 is a data flow diagram of a process 400 for making recommendations, in accordance with some embodiments of the present disclosure. In the process 400, a SIEM, such as the SIEMS 104 can generate a security incident 402. The security incident 402 can indicate malicious activity on a client's network. The security incident 402 can thus generate incident data 404. The incident data 404 can be similar to the incident data 114 described with respect to FIG. 1. Referring back to FIG. 4, in response to the security incident 402, the recommendation manager 110 can input the incident data 404 to a recommendation model 406. The recommendation model 406 can be similar to the action model 106. Additionally, the recommendation model 406 can include previous tickets 408. The previous tickets 408 can be similar to the ticket data 116. The recommendation model 406 can thus provide a list of recommended actions based on the incident data 404 of the security incident 402. The list of recommended actions can be input to a process, cross-reference targets to actions 414, described in greater detail below.

In addition to providing incident data 404 to the recommendation model 406, the recommendation manager 110 can input incident data 404 to a collaborative filtering model 410. The collaborative filtering model 410 can be similar to the collaborative filtering model 108. Additionally, the collaborative filtering model 410 can include previous targets 412. The previous targets 412 can be data about targets of security incidents, and can be similar to the target data 118. In response to the incident data 404, the collaborative filtering model 410 can generate a list of similar targets to the target of the security incident 402, and a corresponding numeric weight value that indicates similarity on a scale from 0 to 100%. Additionally, the recommendation manager 110 can input the list of similar targets to the process cross-reference targets to actions 414.

In cross-reference targets to actions 414, the recommendation manager 110 can identify recommended actions from the recommendation model 406 that have been performed by similar targets from the collaborative filtering model 410. Additionally, the recommendation manager 110 can assign the weighting value of such target to the corresponding action. Further, the recommendation manager 110 can further weight recommended actions based on whether a historical outcome was successful. The recommendation manager 110 can thus produce a prioritized list of recommended actions 420 that is sorted based on the weights assigned to each.

The cross-reference targets to actions 414 can thus generate a weighted list of recommended actions for input to a process, timing analysis 416. The timing analysis 416 can involve the recommendation manager 110 further weighting recommended actions based on the timing of the historical action and the timing of the current security incident 402.

Figure 5:
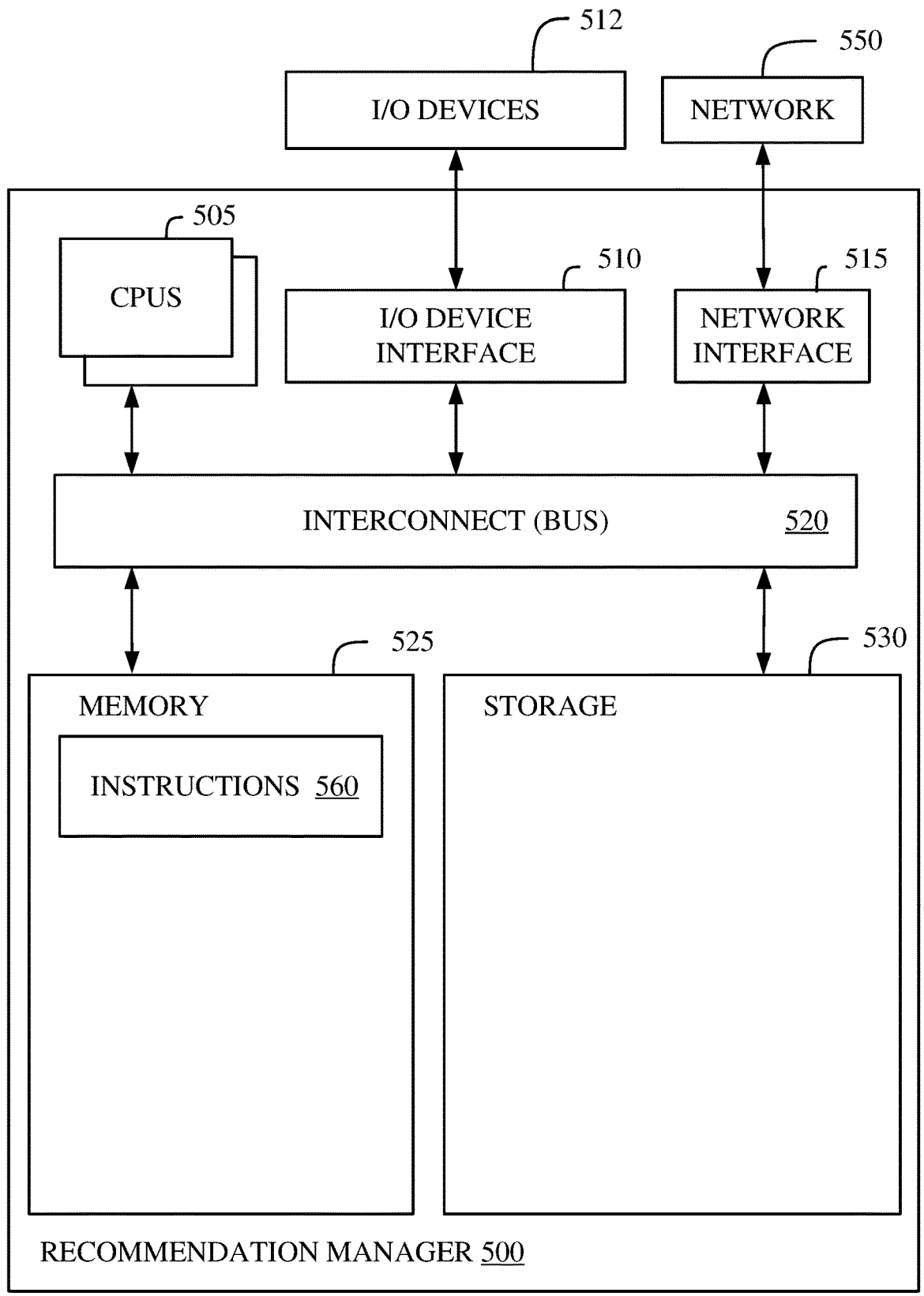
FIG. 5 is a block diagram of an example system for making security recommendations, in accordance with some embodiments of the present disclosure.

FIG. 5 is a block diagram of an example recommendation manager 500, in accordance with some embodiments of the present disclosure. In various embodiments, the recommendation manager 500 is similar to the recommendation manager 110 and can perform the methods described in FIGS. 2 and 3 and/or the functionality discussed in FIGS. 1 and 4. In some embodiments, the recommendation manager 500 provides instructions for the aforementioned methods and/or functionalities to a client machine such that the client machine executes the method, or a portion of the method, based on the instructions provided by the recommendation manager 500. In some embodiments, the recommendation manager 500 comprises software executing on hardware incorporated into a plurality of devices.

The recommendation manager 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, and/or flash memory devices. Additionally, the storage 530 can include storage area-network (SAN) devices, the cloud, or other devices connected to the recommendation manager 500 via the I/O device interface 510 or to a network 550 via the network interface 515.

In some embodiments, the memory 525 stores instructions 560. However, in various embodiments, the instructions 560 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all, any of the methods described in FIGS. 2 and 3 and/or the functionality discussed in FIGS. 1 and 4.

In various embodiments, the I/O devices 512 include an interface capable of presenting information and receiving input. For example, I/O devices 512 can present information to a listener interacting with recommendation manager 500 and receive input from the listener.

The recommendation manager 500 is connected to the network 550 via the network interface 515. Network 550 can comprise a physical, wireless, cellular, or different network.

In some embodiments, the recommendation manager 500 can be a multi-user mainframe computer system, a single-user system, or a server computer or similar device that has little or no direct user interface but receives requests from other computer systems (clients). Further, in some embodiments, the recommendation manager 500 can be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary recommendation manager 500. In some embodiments, however, individual components can have greater or lesser complexity than as represented in FIG. 5, components other than or in addition to those shown in FIG. 5 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
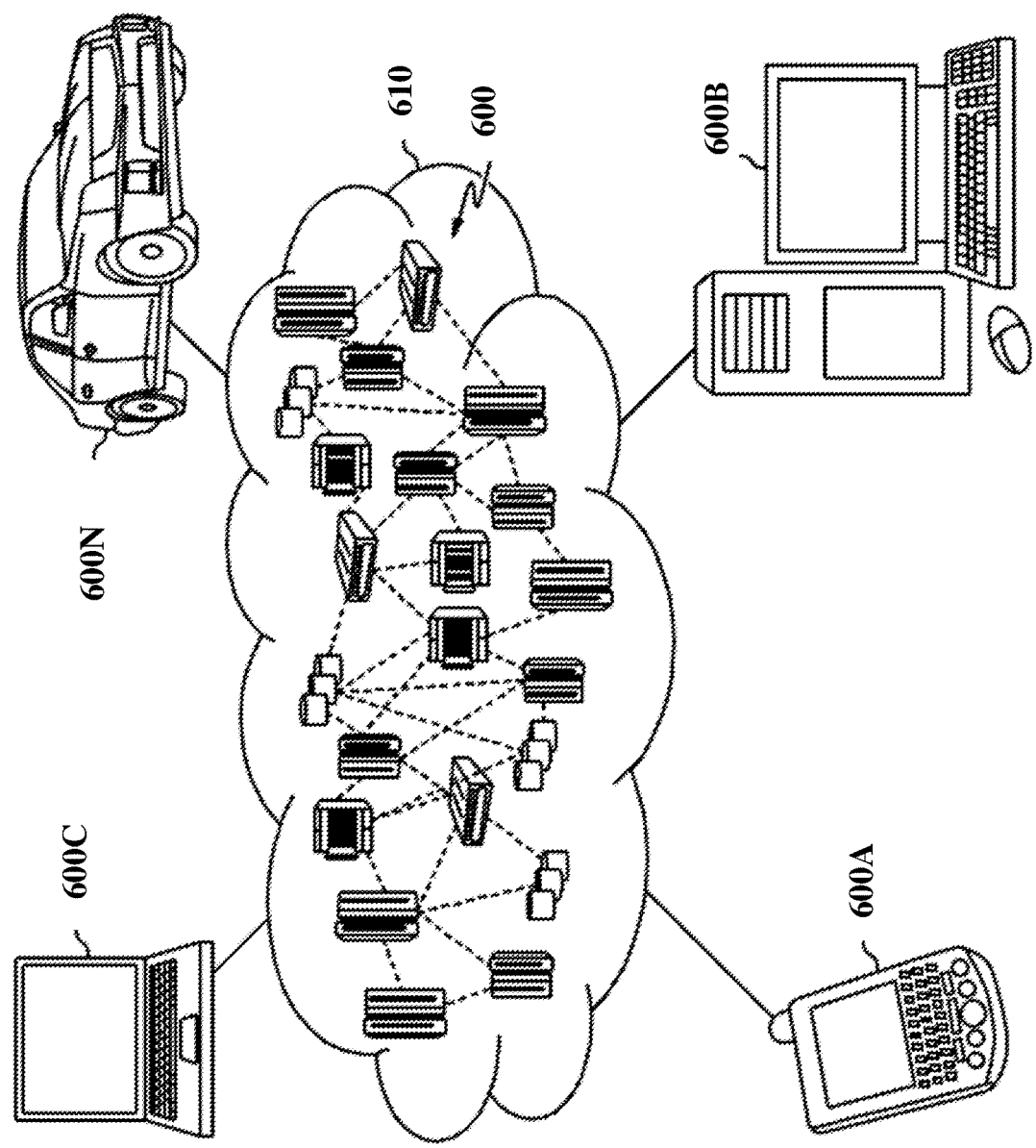
FIG. 6 is a cloud computing environment, in accordance with some embodiments of the present disclosure.

FIG. 6 is a cloud computing environment 610, according to some embodiments of the present disclosure. As shown, cloud computing environment 610 includes one or more cloud computing nodes 600. The cloud computing nodes 600 can perform the methods described in FIGS. 2 and 3 and/or the functionality discussed in FIGS. 1 and 4. Additionally, cloud computing nodes 600 can communicate with local computing devices used by cloud consumers, such as, for example, personal digital assistant (PDA) or cellular telephone 600A, desktop computer 600B, laptop computer 600C, and/or automobile computer system 600N. Further, the cloud computing nodes 600 can communicate with one another. The cloud computing nodes 600 can also be grouped (not shown) physically or virtually, in one or more networks, such as Private, Community, Public, or Hybrid clouds as described hereinabove, or a combination thereof. This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
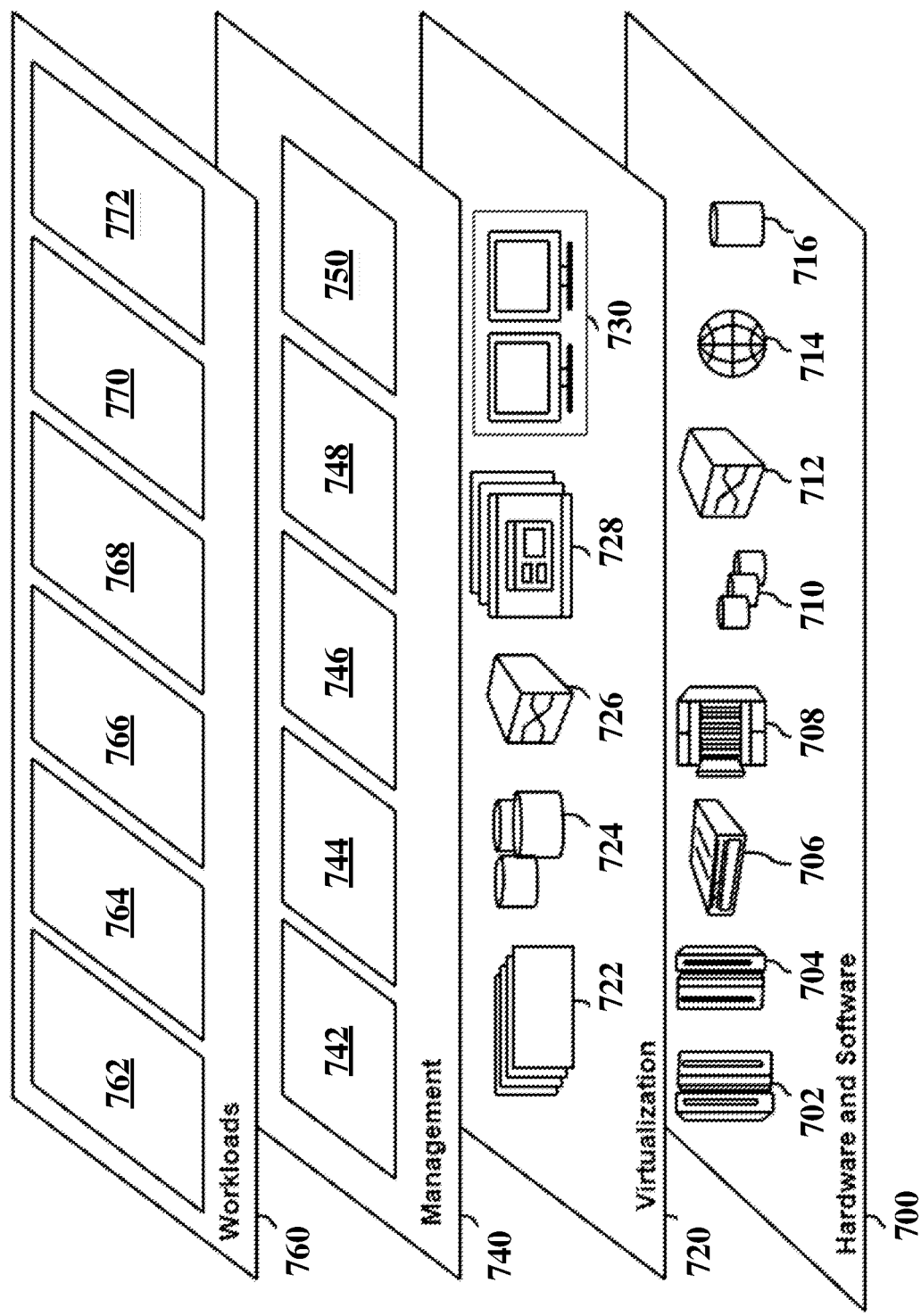
FIG. 7 is a set of functional abstraction model layers provided by the cloud computing environment, in accordance with some embodiments of the present disclosure.

FIG. 7 is a set of functional abstraction model layers provided by cloud computing environment 610 (FIG. 6), according to some embodiments of the present disclosure. It should be understood in advance that the components, layers, and functions shown in FIG. 7 are intended to be illustrative only and embodiments of the disclosure are not limited thereto. As depicted below, the following layers and corresponding functions are provided.

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities can be provided: virtual servers 722; virtual storage 724; virtual networks 726, including virtual private networks; virtual applications and operating systems 728; and virtual clients 730.

In one example, management layer 740 can provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service level management 748 can allocate suitable processing power and memory to process static sensor data. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment can be utilized. Examples of workloads and functions which can be provided from this layer include: mapping and navigation 762; software development and lifecycle management 764; virtual classroom education delivery 766; data analytics processing 768; transaction processing 770; and recommendation manager 772.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Python or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
   determining a plurality of recommended actions based on a security incident identified by a security information and event management (SIEM) system using an action model trained to make recommendations by:
      determining a plurality of similar targets to a potential target of the security incident, wherein the similar targets and the potential target comprise a computer communication networking infrastructure, using a collaborative filtering model trained to assign a confidence value of similarity between an organization having a first networking infrastructure and the potential target, wherein the confidence value of similarity indicates a similarity in one or more shared characteristics, wherein similar targets can be determined based upon organizational factors of the similar targets and the potential target;
      generating a plurality of actions taken by the similar targets using the action model;
      assigning a plurality of weights to the actions based on:
         one or more actions taken by the similar targets and the confidence value; and
         a success or failure of the recommended actions; and
      generating a prioritized list of the recommended actions that is sorted based on the assigned weights.

2. The method of claim 1, wherein assigning the weights is further based on a timing of the security incident and a timing of the recommended actions.

3. The method of claim 1, further comprising generating the prioritized list of recommended actions to include a success rate of one or more of the recommended actions.

4. The method of claim 1, further comprising determining that one of the similar targets has performed one of the recommended actions.

5. The method of claim 4, further comprising assigning the confidence value of the one similar target to the one recommended action.

6. The method of claim 1, wherein the action model comprises a regression model.

7. The method of claim 1, wherein the collaborative filtering model uses weighted alternate least squares to identify the similar targets.

8. The method of claim 1, wherein one of the recommended actions comprises a short term action that is prioritized based on the security incident being critical based on a point in time when the security incident takes place.

9. A computer program product comprising program instructions stored on one or more computer readable storage media, the program instructions executable by one or more computer processors to cause the computer processors to perform a method comprising:
 determining a plurality of recommended actions based on a security incident identified by a security information and event management (SIEM) system using an action model trained to make recommendations by:
  determining a plurality of similar targets to a potential target of the security incident, wherein the similar targets and the potential target comprise a computer communication networking infrastructure, using a collaborative filtering model trained to assign a confidence value of similarity between an organization having a first networking infrastructure and the potential target, wherein the confidence value of similarity indicates a similarity in one or more shared characteristics, wherein similar targets can be determined based upon organizational factors of the similar targets and the potential target;
  generating a plurality of actions taken by the similar targets using the action model;
  assigning a plurality of weights to the actions based on:
   one or more actions taken by the similar targets and the confidence value; and
   a success or failure of the recommended actions; and
  generating a prioritized list of the recommended actions that is sorted based on the assigned weights.

10. The computer program product of claim 9, the method further comprising generating the prioritized list of recommended actions to include a success rate of one or more of the recommended actions.

11. The computer program product of claim 9, the method further comprising determining that one of the similar targets has performed one of the recommended actions.

12. The computer program product of claim 11, the method further comprising assigning the confidence value of the one similar target to the one recommended action.

13. The computer program product of claim 9, wherein the action model comprises a regression model.

14. The computer program product of claim 9, wherein the collaborative filtering model uses weighted alternate least squares to identify the similar targets.

15. The computer program product of claim 9, wherein one of the recommended actions comprises a short term action that is prioritized based on the security incident being critical based on a point in time when the security incident takes place.

16. A system comprising:
 one or more computer processing circuits; and
 one or more computer-readable storage media storing instructions, which, when executed by the one or more computer processing circuits, are configured to cause the one or more computer processing circuits to perform a method comprising:
  determining a plurality of recommended actions based on a security incident identified by a security information and event management (SIEM) system using an action model trained to make recommendations by:
   determining a plurality of similar targets to a potential target of the security incident, wherein the similar targets and the potential target comprise a computer communication networking infrastructure, using a collaborative filtering model trained to assign a confidence value of similarity between an organization having a first networking infrastructure and the potential target, wherein the confidence value of similarity indicates a similarity in one or more shared characteristics, wherein similar targets can be determined based upon organizational factors of the similar targets and the potential target;
   generating a plurality of actions taken by the similar targets using the action model;
   assigning a plurality of weights to the actions based on:
    one or more actions taken by the similar targets and the confidence value; and
    a success or failure of the recommended actions; and
   generating a prioritized list of the recommended actions that is sorted based on the assigned weights.

17. The system of claim 16, the method further comprising:
 determining that one of the similar targets has performed one of the recommended actions; and
 assigning the confidence value of the one similar target to the one recommended action.

18. The system of claim 16, wherein the action model comprises a regression model.

19. The system of claim 16, wherein the collaborative filtering model uses weighted alternate least squares to identify the similar targets.

20. The system of claim 16, wherein one of the recommended actions comprises a short term action that is prioritized based on the security incident being critical based on a point in time when the security incident takes place.

21. A computer-implemented method, comprising:
 determining a plurality of recommended actions based on a security incident identified by a security information and event management (SIEM) system using an action model trained to make recommendations by:
  determining a plurality of similar targets to a potential target of the security incident, wherein the similar targets and the potential target comprise a computer communication networking infrastructure, using a collaborative filtering model trained to assign a confidence value of similarity between an organization having a first networking infrastructure and the potential target, wherein the confidence value of similarity indicates a similarity in one or more shared characteristics, wherein similar targets can be determined based upon organizational factors of the similar targets and the potential target;
  generating a plurality of actions taken by the similar targets using the action model;
  assigning a plurality of weights to the actions based on:
   one or more actions taken by the similar targets and the confidence value; and
   a success or failure of the recommended actions; and
   a timing of the security incident and a timing of the recommended actions; and
 generating a prioritized list of the recommended actions that is sorted based on the assigned weights, wherein the prioritized list of recommended actions comprises a success rate of one or more of the recommended actions.

22. The method of claim 21, further comprising:
   determining that one of the similar targets has performed one of the recommended actions; and
   assigning the confidence value of the one similar target to the one recommended action.

23. The method of claim 21, wherein the action model comprises a regression model.

24. A computer program product comprising program instructions stored on one or more computer readable storage media, the program instructions executable by one or more computer processors to cause the computer processors to perform a method comprising:
   determining a plurality of recommended actions based on a security incident identified by a security information and event management (SIEM) system using an action model trained to make recommendations by:
      determining a plurality of similar targets to a potential target of the security incident, wherein the similar targets and the potential target comprise a computer communication networking infrastructure, using a collaborative filtering model trained to assign a confidence value of similarity between an organization having a first networking infrastructure and the potential target, wherein the confidence value of similarity indicates a similarity in one or more shared characteristics, wherein similar targets can be determined based upon organizational factors of the similar targets and the potential target;
      generating a plurality of actions taken by the similar targets using the action model;
      assigning a plurality of weights to the actions based on:
         one or more actions taken by the similar targets and the confidence value;
         a success or failure of the recommended actions; and
         a timing of the security incident and a timing of the recommended actions; and
   generating a prioritized list of the recommended actions that is sorted based on the assigned weights, wherein the prioritized list of recommended actions comprises a success rate of one or more of the recommended actions.

25. The computer program product of claim 24, wherein the collaborative filtering model uses weighted alternate least squares to identify the similar targets.

* * * * *